UNITED STATES PATENT OFFICE.

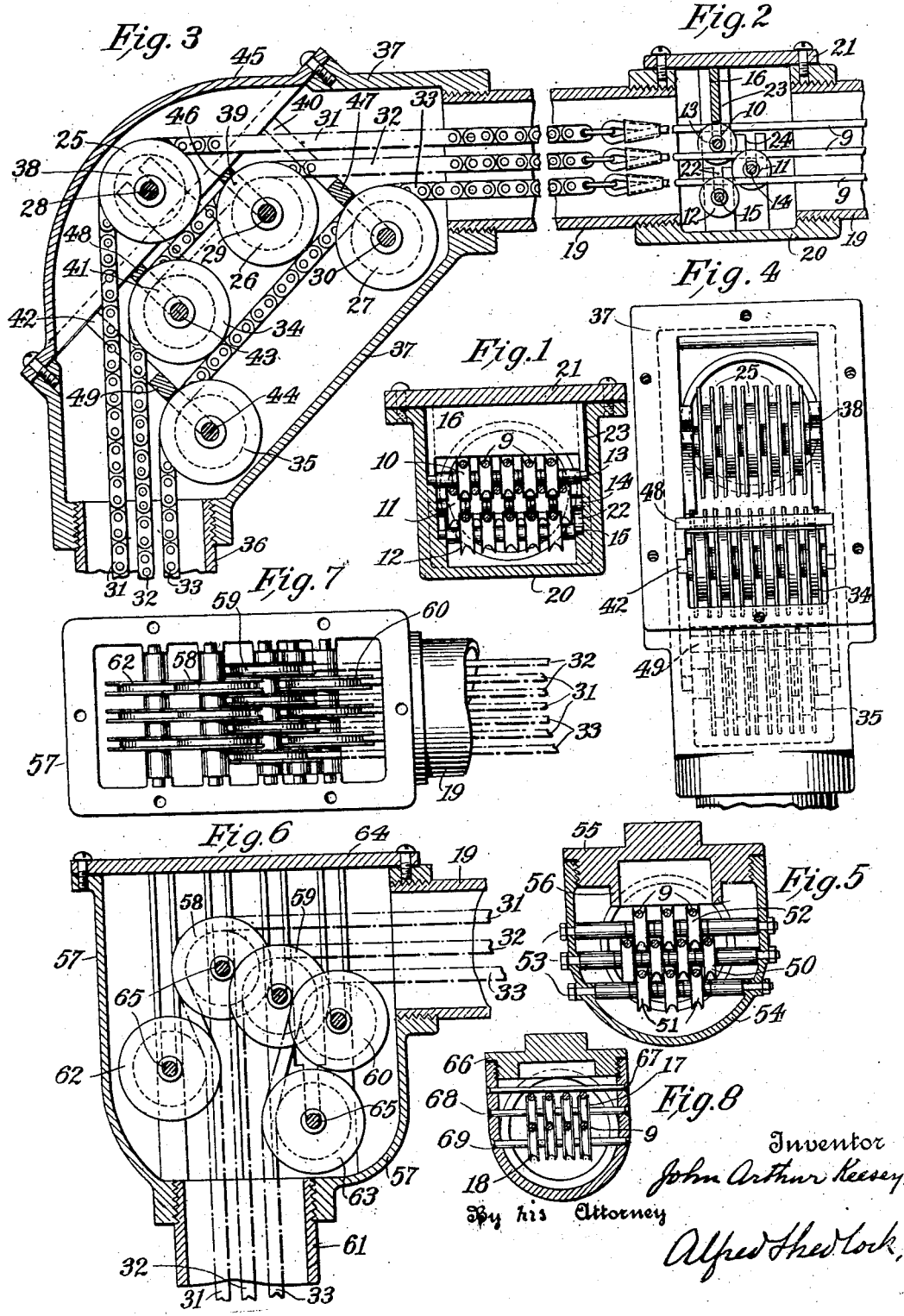

JOHN ARTHUR KEESEY, OF BROOKLYN, NEW YORK.

GUIDE AND SUPPORT FOR SIGNAL-RODS.

1,251,240.  Specification of Letters Patent.  Patented Dec. 25, 1917.

Application filed June 14, 1917. Serial No. 174,703.

*To all whom it may concern:*

Be it known that I, JOHN ARTHUR KEESEY, a citizen of the United States, residing at Brooklyn, county of Kings, State of New York, have invented new and useful Improvements in Guides and Supports for Signal-Rods, of which the following is a specification.

In an application for Letters Patent filed by me November 13, 1916, Serial Number 131,130, is shown and claimed means for supporting and guiding the operating rods of mechanical telegraph systems, including certain modifications which have been eliminated from said application and are now the base of this application.

For the purpose of this invention the connecting rods of signaling apparatus are divided into groups arranged in different horizontal planes, each group being supported by a set of grooved loose pulleys individually free to rotate on a bearing bar or shaft. The arrangement is such that the pulleys of an upper group hold the rods in the pulleys of a lower set or group. All of the rods are inclosed in a tubular container, which is provided at suitable intervals with boxes or T's, and the various sets of rod supporting pulleys are located in said boxes or T's.

Operating connections between signaling apparatus often have to extend in various angular directions, and the invention contemplates the use of angle boxes containing sets of pulleys adapted to hold and guide chains which are attached to the ends of the rods. These pulleys are so arranged in the angle boxes that the chains are guided, in accordance with the arrangement of the rods in the tubular container, to enter and leave the angle boxes in the same order.

Embodiments of this invention are illustrated in the accompanying drawings, in which:

Figure 1, is a transverse section of a box containing rod supporting pulleys, the rods of the different groups being staggered.

Fig. 2, a longitudinal section of the same.

Fig. 3, a longitudinal section of an angle box containing chain pulleys, showing the chains connected to the rods held in a box, as Fig. 2.

Fig. 4, an end view of Fig. 3, with the box cover removed.

Fig. 5, a transverse section of an ordinary T pipe connection, as a containing box for the rod supporting pulleys, showing a less number of rods than in Figs. 1 and 2, and a different arrangement of the supporting pulleys.

Fig. 6, a section of an angle box with chain pulleys adapted to coöperate with rods as arranged in Fig. 5.

Fig. 7, a plan view of Fig. 6, with the cover of the box removed, and:

Fig. 8, a transverse section of a T pipe connection, showing the rods and their supporting pulleys differently arranged.

In the operation of mechanical telegraphs it is very important that the connections between order sending and receiving apparatus be positive in action and be fully protected against accidents. It is also advantageous that the containers or conduits for the operating rods and chains be as small as possible, particularly when such signaling systems are installed on ships, and also to place in each conduit a maximum number of rods commensurate with individual freedom of movement and proper action of the rods. This invention is devised to meet these conditions, to simplify the work of connecting coacting apparatus and to generally facilitate the installation of such telegraph systems.

In Figs. 1 to 4, sixteen rod connections are shown, arranged in three groups, an upper and lower group of five rods each and a middle group of six rods. The rods 9, are supported in three sets of grooved loose pulleys 10, 11 12, carried on bars or shafts 13, 14, and 15, respectively. Shafts 10 and 12, are in the same vertical plane, shaft 11, is located at one side thereof, as seen in Fig. 2. The rods 9, are held in the grooves of pulleys 12, by the hubs of the pulleys 11, on the shaft 14, and the rods in the grooves of pulleys 11, are held therein by the hubs of the top set of pulleys 10. The upper group of rods are retained in the grooves of the pulleys 10, by a plate 16, held in grooves in the sides of the box. This arrangement of the sets of pulleys permits the use of rod supporting pulleys of good working size. If the three shafts 13, 14 and 15 were included in one vertical plane the distances between them would be inadequate for the employment of grooved pulleys, such as are shown in Fig. 8. In this view the pulleys of the upper set 17, are directly over those of the lower set 18, and the upper set of pulleys 17, prevent the lower group of rods 9, leaving the pulleys 18.

The rods on pulleys 11 and 12, pass between adjacent pulleys of the sets 10 and 11, respectively, see Fig. 1.

The rod containing tubes 19, which may be ordinary wrought iron gas pipe, are screwed into the ends of the box 20, which has a cover 21, held in place by screws or bolts. Vertical grooves are formed in the opposed inner sides of the box for the reception of the shafts 13, 14, 15. Shaft 15, seats in the grooves 22, shaft 13 seats in grooves 23, in line with the grooves 22, but with their opposed faces wider apart than those of grooves 22, as shown in Fig. 1. The shaft 14, seats in grooves 24.

An angle or elbow box Fig. 3, is shown in line with the box of Fig. 2, screwed on the end of the rod containing pipe 19. Located in this box are three main sets of pulleys 25, 26, 27, carried on shafts 28, 29, 30, respectively and over which pass sets of chains 31, 32, and 33, which are attached to the groups of rods 9, supported by the sets of pulleys 10, 11, and 12, respectively. Two sets of guide pulleys 34, 35, direct the two sets of chains 32, 33, in a downward or vertical position through a conduit pipe connection 36, in the same order in which the chains enter the angle box 37. Grooves 38, 39, 40, 41 and 42, are formed or cast in the opposed side walls of the box 37, for the reception of the shafts 28, 29, 30, of the main sets of pulleys 25, 26, 27, and the shafts 43, 44, of the two sets of guide pulleys 34, 35, respectively. Chains 32, are held in the grooves of their pulleys by the peripheries of the pulleys 25, and the chains 33, are held in their pulleys by the peripheries of the pulleys 26, and 34. The cover 45, of the box 37, holds the chains 31 in the pulleys 25. Plates or bars 46, 47, 48, 49, may be set in the grooves 39, 40, 41, 42, as a means for holding the chains in their respective pulleys.

A less number of rods and chains are shown in Figs. 5, 6 and 7, than in the views Figs. 1 to 4, the lateral spacing of the grooved rod supporting pulleys being adequate for the pulleys of the central set 50, to work between the pulleys of the upper and lower sets 51 and 52. As shown in Fig. 5, the three sets of pulleys 50, 51, 52, are carried on bearing bars 53, held in holes formed in the sides of a T connection 54. The hubs of pulleys 50, hold the rods 9, in the pulleys 51, and the hubs of the upper set 52, hold the rods in the pulleys 50. The screw plug 55, of the T 54, is provided with an internal flange 56, formed and arranged to hold the upper set or group of rods 9, in the top set of pulleys 52.

The box 57, Fig. 6, for changing the angular direction of the power transmitting connections contains sets of pulleys 58, 59, 60, over which pass the three sets of chains 31, 32, 33, respectively. These chains are connected to the three groups of rods supported by the pulleys 52, 50, 51. The pulleys 59, extend between the pulleys 58 and 60, and the hubs of 59, hold the chains in the pulleys 60, while the hubs of 58, hold the chains in the pulleys 59. Chains 32, controlled by the pulleys 59, pass down centrally through the vertical pipe container 61, which is screwed into the lower end of the box 57; chains 31, are held in pulleys 58, by guide pulleys 62, and the chains 33, are guided by pulleys 63. An opening in top of the box 57, is closed by a cover 64. The shafts 65, which carry the different sets of pulleys 58, 59, 60, 62 and 63, have bearings in grooves formed in the sides of the box 57, as in the other cases described. These shafts may be supported in holes formed through the sides of the box.

The T connection 56, shown in Fig. 8, is closed by an ordinary plug 66. The two sets of grooved pulleys are in a vertical plane; the lower group of rods are held in the set of pulleys 18, by the set of pulleys 17, and the upper group of rods are held in the set of pulleys 17, by a bar 67. This bar 67, as well as the bars 68 and 69 acting as bearings for the sets of pulleys 17 and 18, are supported in holes formed through the sides of the T.

I claim:

1. A signaling system, comprising a plurality of power transmitting connections divided into groups located in different horizontal planes, a set of grooved pulleys for supporting and guiding each group, a shaft for each group of pulleys, the lower group of transverse connections being retained in the lower set of pulleys by the pulleys of a set directly above them and means for retaining the top group of transverse connections in the upper set of pulleys.

2. A signaling system, comprising a plurality of power transmitting connections consisting of rods and chains and divided into groups located in different planes, a container or conduit for the rods consisting of lengths of pipe joined by straight-run boxes and angle boxes at the ends of the conduit, a set of grooved pulleys for supporting and guiding each group of rods in the straight-run boxes and their connected chains in the angle boxes, a shaft for each set of pulleys held in the straight-run and angle boxes and means for retaining the rods in the pulleys contained in the straight-run boxes and for retaining the chains in the pulleys contained in the angle boxes.

3. A signaling system, comprising a plurality of power transmitting connections divided into groups located in different planes, a container or conduit for the transmitting connections including boxes having grooves formed in their opposed inner sides, a set of grooved pulleys for supporting and guiding each group, a shaft for each set of pulleys and seated in the grooves of the boxes, each lower group of power transmitting connections being retained in its set of pulleys by the adjacent upper set of pulleys, and a cover for each of the boxes adapted to retain the top group of transmitting connections in operative position.

4. A signaling system, comprising a plurality of power transmitting connections divided into groups located in different planes and staggered, a set of grooved pulleys for supporting and guiding each group, the rods carried by the alternating sets of pulleys extending between the pulleys of the adjacent sets and means for holding the transmitting connections in their respective pulleys.

5. A signaling system, comprising a plurality of power transmitting connections divided into groups located in different horizontal and vertical planes, a set of grooved pulleys for supporting and guiding each group of transmitting connections, the alternating sets of pulleys extending between the pulleys of adjacent sets, the pulleys being so arranged that the hubs of a set in a higher plane will hold the group of transmitting connections in the grooves of a set of pulleys located in a lower plane.

Signed at New York, county and State of New York, this 11 day of June, 1917.

JOHN ARTHUR KEESEY.

In the presence of—
Wm. J. Dolan,
James A. Hudson.

Copies of this patent may be obtained for five cents each, by addressing the "Commissioner of Patents, Washington, D. C."